US009714313B2

(12) United States Patent
Custers et al.

(10) Patent No.: US 9,714,313 B2
(45) Date of Patent: Jul. 25, 2017

(54) AMPHOLYTIC POLYMERIC SYSTEM (75) Inventors: Johannes Petrus Aldegonda Custers, Baexem (NL); Leonard Franciscus Sophia Stemkens, Baarlo (NL); Dirk Theodorus Andreas van Asseldonk, Veghel (NL)

(73) Assignee: Afira IPR B.V., Eindhoven (NL)

( * ) Notice: Subject to any disclaimer, the term of this patent is extended or adjusted under 35 U.S.C. 154(b) by 676 days.

(21) Appl. No.: 14/115,842

(22) PCT Filed: May 4, 2012

(86) PCT No.: PCT/NL2012/050307
§ 371 (c)(1),
(2), (4) Date: Jan. 30, 2014

(87) PCT Pub. No.: WO2012/154040
PCT Pub. Date: Nov. 15, 2012

(65) Prior Publication Data
US 2014/0190893 A1    Jul. 10, 2014

Related U.S. Application Data (60) Provisional application No. 61/483,136, filed on May 6, 2011.

(30) Foreign Application Priority Data

May 6, 2011 (EP) ..................... 11165136

(51) Int. Cl.
C02F 1/42    (2006.01)
B01D 39/16    (2006.01)
(Continued)

(52) U.S. Cl.
CPC ............. *C08F 273/00* (2013.01); *B01J 43/00* (2013.01); *B01J 49/45* (2017.01); *C02F 1/42* (2013.01);
(Continued)

(58) Field of Classification Search
None
See application file for complete search history.

(56) References Cited

U.S. PATENT DOCUMENTS 5,969,052 A * 10/1999 Mumick ................. A61L 15/24
525/329.9
2003/0232895 A1* 12/2003 Omidian ............... A61K 9/0065
521/99
(Continued)

FOREIGN PATENT DOCUMENTS

NL    WO 2009028944 A1 *  3/2009  ......... B01D 15/3876
WO    WO-2009/028944 A1    3/2009

OTHER PUBLICATIONS

Murali Mohan Y, et al. Polyampholytic hydrogels: Poly(N-isopropylacrylamide)-based stimuli-responsive networks with poly(ethyleneimine) Reactive & Functional Polymers, 2007, vol. 67, No. 2, pp. 144-155.
(Continued)

Primary Examiner — Clare Perrin
(74) Attorney, Agent, or Firm — Gilberto M. Villacorta; Sunit Talapatra; Foley & Lardner LLP

(57) ABSTRACT

The present invention relates to an ampholytic polymeric system obtainable by a process comprising the copolymerization of (i) a monomer according to Formula (1), (ii) an ethylenically unsaturated cationic monomer and (iii) a (co)polymer comprising an ethylenically unsaturated anionic monomer which comprises a sulfonate group: (1) wherein X is O or $NR^2$, $R^1$ and $R^2$ are independently selected from the group consisting of hydrogen and C1-C6 alkyl groups or wherein $R^1$ and $R^2$ form together a $(CR^1R^2)n$- chain, wherein n is 3 to 12, and wherein $R^3$ is independently selected from the group consisting of hydrogen and $CH_3$.

(Continued)

The present invention further relates to the use of ampholytic polymeric system in separation processes.

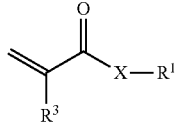

(1)

15 Claims, 3 Drawing Sheets

(51) Int. Cl.
| | |
|---|---|
| C08F 12/08 | (2006.01) |
| C08F 212/08 | (2006.01) |
| C08F 28/00 | (2006.01) |
| C08F 228/00 | (2006.01) |
| C08F 273/00 | (2006.01) |
| C08F 257/02 | (2006.01) |
| C08F 257/00 | (2006.01) |
| B01J 43/00 | (2006.01) |
| C08F 220/06 | (2006.01) |
| C08F 220/36 | (2006.01) |
| C08F 220/58 | (2006.01) |
| C08F 26/02 | (2006.01) |
| C08F 28/02 | (2006.01) |
| B01J 49/45 | (2017.01) |
| B01D 39/00 | (2006.01) |
| B01D 39/14 | (2006.01) |
| B01D 71/06 | (2006.01) |
| C02F 5/00 | (2006.01) |

(52) U.S. Cl.
CPC .............. *C08F 26/02* (2013.01); *C08F 28/02* (2013.01); *C08F 220/06* (2013.01); *C08F 220/36* (2013.01); *C08F 220/58* (2013.01); *C08F 257/00* (2013.01); *C08F 257/02* (2013.01); *B01D 39/1692* (2013.01); *C02F 5/00* (2013.01); *C02F 2001/422* (2013.01); *C02F 2001/425* (2013.01); *C02F 2307/12* (2013.01)

(56) References Cited

U.S. PATENT DOCUMENTS

| | | | |
|---|---|---|---|
| 2005/0011826 A1* | 1/2005 | Childs | B01D 67/0006 210/490 |
| 2006/0142430 A1* | 6/2006 | Harrington | D21H 17/67 524/13 |
| 2007/0043189 A1 | 2/2007 | Hsu et al. | |
| 2008/0089940 A1* | 4/2008 | Omidian | A61K 9/06 424/487 |

OTHER PUBLICATIONS

International Search Report mailed Aug. 6, 2012 in Application No. PCT/NL2012/050307.

\* cited by examiner

AMPHOLYTIC POLYMERIC SYSTEM

CROSS-REFERENCE TO RELATED APPLICATIONS

This application is the National Phase of International Patent Application No. PCT/NL2012/050307, filed May 4, 2012, published as WO 2012/154040, which claims priority to European Application No. 11165136.0 and U.S. Provisional Application No. 61/483,136, both filed May 6, 2011. The contents of these applications are herein incorporated by reference in their entirety.

FIELD OF THE INVENTION

The present invention relates to an ampholytic polymeric system and a process for its preparation. The present invention also relates to the application of the ampholytic polymeric system in separation processes, in particular in a process for separating charged species, in particular metal cations, from aqueous systems.

BACKGROUND OF THE INVENTION

Current demineralization or softening systems often make use of ion exchange resins, e.g. in water purification plants, or softening chemicals, e.g. in laundry washing-machines and dishwashing-machines. The main disadvantage of the resins is that they loose their ion exchange capacity after a period of time and need to be regenerated. This regeneration step involves the use of additional chemicals like acids, bases or salts. These chemicals are harmful for the environment because they can cause salinisation. The same holds for softening chemicals used in washing formulations used in laundry washing-machines and dish washing-machines. Salinisation is known as the accumulation of soluble mineral salts near the surface of soil, usually caused by the capillary flow of water from saline ground water. Where the rate of surface evaporation is high, irrigation can exacerbate the problem by moistening the soil and causing water to be drawn from deeper levels as water evaporates from the surface. The evaporation of pure water leaves the salts behind, allowing them to accumulate, and they can reach concentrations that are toxic to plants, thus sterilising the land.

Alternative demineralisation or softening systems can be based on thermo-regenerable ion exchange resins. These resins can be regenerated at lower or higher temperatures than the temperature at which they are used without the addition of chemicals. Various systems and resins are discussed in WO 2009/028944, incorporated by reference.

WO 2009/028944 discloses a process for separating a charged species from an aqueous system, said process comprising the steps of: (1) contacting a first aqueous system comprising the charged species at a first temperature with an ampholytic polymeric system comprising cationic and anionic domains, wherein the charged species is bonded to the ampholytic polymeric system, and (2) contacting the ampholytic polymeric system with a second aqueous system at a second temperature, wherein the charged species is released to the second aqueous system, wherein the second temperature is higher than the first temperature and wherein the second temperature is less than 60° C. The ampholytic polymer system is preferably a (semi)-IPN having anionic and cationic domains and is prepared by copolymerising at least a LCST-monomer, a cationic monomer selected from the group consisting of vinyl and isopropenyl monomers containing a cationic form of alkyl or aryl amines or of nitrogen-containing heterocyclic aromatic compounds, and a anionic monomer selected from the group consisting of vinyl and isopropenyl monomers containing an anionic group, e.g. an acid such as carboxylate, sulfonate, phosphate, phosphonate, phosphinate, preferably a carboxylate. Example 1 discloses the synthesis of a semi-IPN from NIPAAm (N-isopropyl acryl amide), PANa (sodium polyacrylate), DMBzEA$^3$mCl (acryloyloxyethyl-(benzyl) dimethylammonium chloride), NPAM (N-piperidyl acryl amide), the cross-linker MBAAm (N,N'-methylenebisacryl amide), and the catalyst system APS (ammonium persulfate)/TMEDA (N,N,N',N'-tetramethyl-ethylenediamine). The charged species to be separated may be cationic or anionic, preferably metal cations and anions derived from organic acids, respectively.

However, the ampholytic polymeric system according to WO 2009/028944 has certain drawbacks, in particular insufficient mechanical properties caused by high swelling ratios and in particular an insufficient desorption performance for $Cu^{2+}$-ions. Moreover, the ampholytic polymeric system according to WO 2009/028944 can only be used over a limited pH-range, i.e. >4.5. Furthermore, the synthesis methods for ampholytic polymer systems described in WO 2009/028944 lead to irregular shaped granules, which cause unwanted flow anomalies in most process designs.

C. K. Trinj et al., Angew. Makromol. Chem., 212, 167-179, 1993, discloses complexes of polyanions and polycations. These complexes can be split into two oppositely charged polyelectrolytes above a certain critical ionic strength. It is shown that in general complexes consisting of polyanions with strongly acidic sulfonate groups and polycations with strongly basic quaternary ammonium groups have a critical ionic strength that is much higher as compared to complexes consisting of polyanions with weakly acidic carboxylate groups and polycations with strongly basic quaternary ammonium groups, which indicates that the latter complexes have generally a weaker ion pair formation.

N. Gundogan et al., Macromol. Chem. Phys 205, 814-823, 2004, discloses the synthesis of hydrogels by APS/TMEDA catalysed free-radical polymerization of N,N-dimethyl acryl amide and bis(acryl amide) in aqueous solution at various monomer concentration and at a fixed crosslink density. The monomer concentration was varied between 0.37 mol/l and 9.7 mol/l.

C-F. Lee et al., J. Polym. Sci., Part A, Polym. Chem. 41, 2053-2063, 2003, discloses polymer particles prepared by emulsion polymerization of NIPAAm and chitosan. Chitosan is a linear polysaccharide composed of randomly distributed β-(1-4)-linked D-glucosamine (deacetylated unit) and N-acetyl-D-glucosamine (acetylated unit).

H. Macková et al., J. Polym. Sci., Part A, Polym. Chem. 45, 5884-5898, 2007, discloses magnetic microspheres prepared by emulsion polymerization of NIPAAm and MBAAm in the presence of γ-$Fe_2O_3$ nanoparticles.

H. Tokuyama et al., Reactive & functional polymers, 67, 136-143, 2007 and H. Tokuyama et al., Reactive & functional polymers, 70, 610-615, 2010, and K. Mizoguchi et al., Separation and purification technology 75, 69-75 2010 disclose different thermoresponsive polymeric systems that are capable of adsorbing heavy metal ions, like $Cu^{2+}$, $Pd^{2+}$ and $Au^{3+}$, at higher temperature (40°-60° C.) and desorption at room temperature. These systems have a desorption temperature which is lower as compared to the adsorption temperature, which is disadvantageous for a lot of processes, because in general ions need to be removed more often from sources of natural water which are most at ambient temperature levels. Furthermore, the systems suffer from a high adsorption degree even at the desorption temperature, which is not beneficial for cyclic processes, especially when low ion concentrations need to be removed.

US 2007/0043189 relates to an amphoteric copolymer of the structure (A), wherein $R_1$ is H or $CH_3$; $R_2$ is a hydrogen atom, or an alkyl group, a cyclic aliphatic group or an aryl group, having 1 to 10 carbon atoms; D is H or $COOR_3$, $R_3$ is a hydrogen atom, or an alkyl group, a cyclic aliphatic group or an aryl group, having 1 to 10 carbon atoms, or a cationic salt group; Z is an O atom or an NH group; A is a —COO group, a —$SO_3$ group or an acid form; a, b, and c is an integer from 1 to 5000; and p and q are integers from 1 to 10. An example of an amphoteric copolymer (A) is copolymer PAMD (B), wherein PAMD is defined as a linear terpolymer of 2-acrylamido-2-methylpropane sulfonic acid (AMPSA), methacrylic acid (MMA) and (α-N,N-dimethyl-N-acryloyloyethyl)ammonium ethanate (DAAE).

Amphoteric copolymer (A) is prepared by a reaction wherein the three monomers are polymerized to form said terpolymer. For example copolymer PAMD (B) is prepared by reacting monomer DAAE with the monomers AMPSA and MAA through a free radical polymerization. The amphoteric copolymers (A) according to US 2007/0043189 are used to improve the fluidity and fluidity retention of cementitious materials.

SUMMARY OF THE INVENTION

The present invention relates to an ampholytic polymeric system obtainable by a process comprising the copolymerisation of (i) a monomer according to Formula (1) and (ii) an ethylenically unsaturated cationic monomer in the presence of (iii) a (co)polymer comprising an ethylenically unsaturated anionic monomer which comprises a sulfonate group:

(1)

wherein X is O or $NR^2$, $R^1$ and $R^2$ are independently selected from the group consisting of hydrogen and $C_1$-$C_6$ alkyl groups or wherein $R^1$ and $R^2$ form together a $(CR^1R^2)_n$-chain, wherein n is 3 to 12, and wherein $R^3$ is independently selected from the group consisting of hydrogen and $CH_3$.

The present invention further relates to a process for the preparation of an ampholytic polymeric system and its use in separation processes, in particular the separation of a charged species from an aqueous system.

DETAILED DESCRIPTION OF THE INVENTION

The verb "to comprise" as is used in this description and in the claims and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one".

The term "(co)polymer" is meant to include homopolymers as well as copolymers of two or more monomers.

The term "arylalkyl" includes arylalkyl groups such as benzyl, but also "alkylaryl" groups such as p-tolyl.

The Ampholytic Polymeric System

The ampholytic polymer system may comprise more than one monomer according to Formula (1).

According to the present invention, X is preferably $NR^2$ which implies that is preferred that the monomer according to Formula (1) is represented by Formula (1a):

(1a)

wherein $R^1$, $R^2$ and $R^3$ are as defined above.

According to the present invention, $R^1$ is hydrogen or a $C_1$-$C_6$ alkyl group, wherein the alkyl group may be linear or branched and is optionally substituted. Suitable alkyl groups include methyl ($CH_3$), ethyl ($C_2H_5$), n-propyl (n-$C_3H_7$), isopropyl or 2-propyl (i-$C_3H_7$), n-butyl (n-$C_4H_9$), 2-butyl (s-$C_4H_9$), 2-methylpropyl (i-$C_4H_9$), 2-methyl-2-propyl (t-C$_4$H$_9$), n-pentyl (n-C$_5$H$_{11}$), 2-pentyl (s-C$_5$H$_{11}$), 3-pentyl, 3-methylbutyl or isopentyl (i-C$_5$H$_{11}$), 3-methyl-2-butyl, 2-methyl-2-butyl, 2,2-dimethylpropyl or neopentyl, 1,1-dimethylpropyl (t-C$_5$H$_{11}$), n-hexyl (n-C$_6$H$_{13}$), 2-hexyl (s-C$_6$H$_{13}$), 4-methylpentyl or isohexyl (i-C$_5$H$_{11}$) and the like. According to a preferred embodiment of the present invention, R$^1$ is i-C$_3$H$_7$. Optionally, when R$^1$ and/or R$^2$ are a C$_1$-C$_6$ alkyl group, the alkyl group is optionally interrupted by one or more hetero-atoms, preferably one to four hetero-atoms, wherein the hetero-atoms are preferably selected from the group consisting of O and N. Accordingly, R$^1$ and R$^2$ include for example a group according to —(CH$_2$)$_2$—O—(CH$_2$)$_2$—O—CH$_3$.

R$^1$ and R$^2$ may form a (CR$^1$R$^2$)$_n$-chain, wherein n is 3 to 12, so that R$^1$, R$^2$ and the nitrogen atom to which they are attached form a cyclic group, e.g. aziridinyl, pyrrolidyl and piperidyl. According to a preferred embodiment, the cyclic group is piperidyl.

According to the present invention, it is preferred that R$^2$ is hydrogen.

According to the present invention, it is preferred that R$^3$ is hydrogen.

The ethylenically unsaturated cationic monomers are preferably vinyl, isopropenyl or (meth)acryl monomers comprising a cationic form of a primary, secondary or tertiary alkyl or aryl amine or of a nitrogen-containing heterocyclic aromatic compound. Preferably, the ethylenically unsaturated cationic monomer is a (meth)acryl monomer comprising a cationic form of a primary, secondary or tertiary alkyl or aryl amine or of a nitrogen-containing heterocyclic aromatic compound.

More preferably, the ethylenically unsaturated cationic monomer has the Formula (2):

(2)

or the Formula (3):

(3)

or the Formula (4):

(4)

wherein:
Y is O or NR$^5$;
R$^3$ is independently selected from the group consisting of hydrogen and CH$_3$;
R$^4$ is independently selected from the group consisting of hydrogen, C$_1$-C$_{12}$ alkyl, C$_6$-C$_{12}$ aryl and C$_7$-C$_{12}$ and arylalkyl;
R$^5$ is independently selected from the group consisting of hydrogen and C$_1$-C$_6$ alkyl;
A is a C$_1$-C$_{12}$ alkylene chain; and
the ethylenically unsaturated cationic monomer comprises a counter-ion Z.

Preferably, R$^3$ and R$^5$ are hydrogen.

When R$^4$ is an alkyl group, the alkyl group may be linear, branched and/or cyclic and may optionally be substituted. Suitable alkyl groups include methyl, ethyl, n-propyl, iso-propyl, t-butyl and the like. When R$^4$ is aryl or arylalkyl, the aryl group and the arylalkyl group may be substituted. According to the present invention, it is preferred that R$^4$ is C$_1$-C$_{12}$ alkyl, more preferably C$_1$-C$_6$ alkyl, most preferably C$_1$-C$_4$ alkyl.

A is a C$_1$-C$_{12}$ alkylene chain and the alkylene chain may be linear or branched and may optionally contain one or more heteroatoms selected from the group consisting of O, N and S. It is preferred that A is linear. In particular, A is a linear, unsubstituted C$_1$-C$_6$ alkylene chain.

According to the invention, in the counter-ion Z$^-$, Z is preferably selected from the group of F, Cl, Br, I, and ½ SO$_4$.

According to the present invention, in the (co)polymer comprising the ethylenically unsaturated anionic monomer which comprises a sulfonate group, the ethylenically unsaturated anionic monomer has the Formula (5):

(5)

or the Formula (6):

(6)

wherein:
R$^3$ is independently selected from the group consisting of hydrogen and CH$_3$;
R$^5$ is independently selected from the group consisting of hydrogen and C$_1$-C$_6$ alkyl;
A is a C$_1$-C$_{12}$ alkylene chain; and
M is a metal of Group 1 of the Periodic Table of the Elements.

Preferably, M is Li, Na or K, more preferably Na or K, and most preferably Na.

Preferred groups for R$^3$, R$^5$ and A are presented above.

It is preferred that the (co)polymer comprising an ethylenically unsaturated anionic monomer which comprises a sulfonate group is a homopolymer of the monomer according to Formula (5).

According to the present invention, it is preferred that the process is performed in the presence of a cross-linker. Preferably, the cross-linker has the Formula (7):

(7)

wherein:
$R^3$ is independently selected from the group consisting of hydrogen and $CH_3$;
Y is independently selected from the group consisting of O and $NR^5$;
$R^5$ is independently selected from the group consisting of hydrogen and $C_1$-$C_6$ alkyl; and
B is independently selected from the group consisting of $-(CR^5{}_2)_m-$, wherein m is 1-12, and $-(CH_2-CHR^3-O)_m-$, wherein m is 1-50.

Preferably, Y is $NR^5$.
Preferred groups for $R^3$ and $R^5$ are presented above.
B is preferably a $-(CR^5{}_2)_m-$ group. It is preferred that m is 1-6, more preferably 1-4.

The ampholytic polymeric system according to the present invention comprises cationic and anionic domains. Although not explicitly necessary, the ampholytic polymer system is preferably charge neutral.

According to the invention, the ampholytic polymeric system is preferably selected from the group consisting of interpenetrating networks (IPN), semi-interpenetrating networks (semi-IPN), random copolymerized networks, grafted polymeric systems, polymeric micelles, polymer brushes attached to a surface, polymer mixtures, or combinations thereof. Such polymeric systems are in principle known in the art and are in more detail disclosed in WO 2009/028944. More preferably, the ampholytic polymeric system is a IPN or a semi-IPN.

Process for Preparing an Ampholytic Polymer

The present invention therefore also relates to a process for the preparation of an ampholytic polymeric system, wherein (i) a monomer according to Formula (1) and (ii) an ethylenically unsaturated cationic monomer are copolymerized in the presence of (iii) a (co)polymer comprising an ethylenically unsaturated anionic monomer which comprises a sulfonate group:

(1)

wherein $R^1$, $R^3$ and X are as defined above.

According to the present invention, X is preferably $NR^2$ which implies that is preferred that the monomer according to Formula (1) is represented by Formula (1a):

(1a)

wherein $R^1$, $R^2$ and $R^3$ are as defined above.

The ethylenically unsaturated cationic monomer has preferably the Formula (2) or the Formula (3) described above. In the (co)polymer comprising an ethylenically unsaturated anionic monomer which comprises a sulfonate group, the ethylenically unsaturated anionic monomer has preferably the Formula (4) described above.

According to the present invention, it is preferred that the process is performed in the presence of (iv) a cross-linker. Preferably, the cross-linker has the Formula (7) described above.

According to the present invention, it is preferred that a monomer mixture comprising about 60 mol % to about 90 mol % (i), about 5 mol % to about 20 mol % of (ii), and about 5 mol % to about 20 mol % of (iii), based on the total amount of 100 mol % (i), (ii) and (iii), are copolymerised.

In one embodiment of the present invention, it is preferred that a mixture comprising about 60 mol % to about 90 mol % of monomer (i), about 5 mol % to about 20 mol % of monomer (ii), and an amount of (co)polymer (iii) such that it contains about 5 mol % to about 20 mol % of the anionic monomer, based on the total amount of monomers of (i), (ii) and (iii), which is 100 mol %, are copolymerised.

If the cross-linker (iv) is present in the monomer mixture, it is preferred that a monomer mixture comprising about 60 mol % to about 90 mol % (i), about 4.9 mol % to about 15 mol % of (ii), about 5 mol % to about 20 mol % of (iii), and about 0.1 mol % to about 5 mol % of (iv), based on the total amount of 100 mol % (i), (ii), (iii) and (iv), are copolymerised.

Thus, if the cross-linker (iv) is present in the monomer mixture, it is preferred that a mixture comprising about 60 mol % to about 90 mol % of monomer (i), about 4.9 mol % to about 15 mol % of monomer (ii), an amount of (co)polymer (iii) such that it contains about 5 mol % to about 20 mol % of the anionic monomer, and about 0.1 mol % to about 5 mol % of (iv), based on the total amount of monomers of (i), (ii), (iii) and (iv), which is 100 mol %, are copolymerised.

Furthermore, it is preferred that the process is conducted in an aqueous solvent system comprising about 50 wt. % to about 100 wt. % water, preferably about 80 wt. % to about 100 wt. % water. Most preferably, the process is conducted in water.

In another preferred embodiment the process is conducted in an aprotic polar organic solvent, wherein a polar solvent is defined as a solvent having a dielectric constant (relative static permittivity) $\in$ at 25° C. of about 7 or higher, preferably of about 15 or higher, more preferably of about 20 or higher and most preferably of about 25 or higher. Examples of an aprotic polar organic solvent include dimethyl sulfoxide (DMSO), N-methylpyrrolidone (NMP), dimethylformamide (DMF), dimethyl acetamide (DMA), hexamethylphosphoric triamide (HMPT), hexamethylphosphorous triamide (HMPA), acetonitrile, tetrahydrofuran (THF), mixtures thereof, or mixtures thereof with water. Alternatively, the process is conducted in a polar protic organic solvent, wherein polar is defined as above, such as for example N-methylformamide (NMF), in water, or mixtures thereof. Accordingly, the process is preferably conducted in an aprotic polar organic solvent, a protic polar organic solvent, water, or mixtures thereof.

In a preferred embodiment, the process is conducted in an aqueous solvent system comprising water and one or more of an aprotic polar organic solvent and/or one or more of a polar protic organic solvent, as defined above. Preferably, said aqueous solvent system comprises about 10 wt. % to about 100 wt. % water, preferably about 20 wt. % to about 100 wt. % water, more preferably about 50 wt. % to about 100 wt. % water, even more preferably about 80 wt. % to about 100 wt. % water. In a further preferred embodiment, the process is conducted in water, in DMSO, or in a mixture of water and DMSO. When the process is conducted in a mixture of water and DMSO, it is preferred that the mixture comprises about 10 wt. % to about 50 wt. % of water, preferably about 15 wt. % to about 30 wt. % of water.

According to a preferred embodiment of the present invention, the process is performed in a water-in-oil emulsion, wherein the oil:water ratio is preferably between about 2:1 to about 20:1, more preferably about 3:1 to about 15:1.

According to another preferred embodiment of the present invention, the process is performed in a solvent-in-oil emulsion, wherein the solvent is a polar protic organic solvent or a polar aprotic organic solvent as defined above, and wherein the oil:solvent ratio is preferably between about 2:1 to about 20:1, more preferably about 3:1 to about 15:1. The solvent in the solvent-in-oil emulsion may comprise a mixture of two or more solvents, for example DMSO and water. In a preferred embodiment said solvent-in-oil emulsion is an emulsion of a mixture of DMSO and water in oil. In a further preferred embodiment the mixture of DMSO and water comprises about 10 wt. % to about 50 wt. % of water, preferably about 15 wt. % to about 30 wt. % of water.

According to an embodiment, the process is conducted with a total monomer concentration of about 1.0 mol/l to about 5.0 mol/l, more preferably about 1.5 mol/l to about 4.0 mol/l, calculated on the amounts of monomers (i), (ii) and (iii).

According to another embodiment, the process is conducted with a total monomer concentration of about 0.1 mol/l to about 1.0 mol/l, more preferably about 0.3 mol/l to about 0.9 mol/l, calculated on the amounts of monomers (i), (ii) and (iii).

Accordingly, the present invention also relates to an ampholytic polymeric system obtainable by the process according to the present invention described above.

Separation Process

The present invention also relates to the use of an ampholytic polymeric system according to the invention in a separation process, in particular a separation process comprising the separation of a charged species from an aqueous system, wherein the charged species is preferably a cation, most preferably a metal cation.

According to the present invention, the metal is preferably selected from group 2, 4, 5, 6, 7, 8, 9, 10 and 11 of the Periodic Table of the Elements (IUPAC Periodic Table of the Elements, version 21 Jan. 2011). More preferably, the metal is selected from the group of calcium, zinc, cobalt, manganese, copper, lead, gold, nickel, cadmium, tin and iron.

In particular, the present invention relates to a process for separating a charged species from an aqueous system, wherein the process comprises the following steps:
  (a) a first aqueous system comprising the charged species is contacted at a first temperature with an ampholytic polymeric system according to the present invention, wherein the charged species is bonded to the ampholytic polymeric system; and
  (b) the ampholytic polymeric system is contacted with a second aqueous system at a second temperature, wherein the charged species is released to the second aqueous system, wherein the second temperature is higher than the first temperature.

According to the present invention, the first and second aqueous systems may originate from a single aqueous feed. In addition, the first and second aqueous system may be the same aqueous system. For example, within the scope of the present invention is a process wherein an aqueous feed is fed to a washing-machine equipped with a means for water softening, said means comprising the ampholytic polymeric system according to the invention, wherein in said means a quantity of water is first subjected to step (a), where after a major portion of the quantity of water is fed to the washing-machine and a minor portion is left into the means for water softening. After the washing process, which in Europe usually is performed at a temperature in the range of about 30° to about 95° C., is finished, the washing water is used to heat the minor portion of the quantity of water in the means for water softening, e.g. via a heat exchanger, so that step (b) of the process according to the present invention takes place. However, the heat could also be provided by other sources, e.g. by solar energy or by an electrical heating unit.

According to the present invention, the difference between the second temperature and the first temperature is between about 1° C. to about 50° C., preferably less than about 35° C., more preferably about 30° C. or less and most preferably about 25° C. or less.

In addition, it is also preferred that the regeneration temperature (second temperature) is less than about 60° C., more preferably about 55° C. or less, even more preferably about 50° C. or less, yet even more preferably about 45° C. or less, yet even more preferably about 40° C. or less, yet even more preferably about 35° C. or less, and most preferably about 30° C. or less.

According to the present invention, the ampholytic polymeric system is efficient either because it can be regenerated at less than about 60° C. or because the temperature difference between the second temperature and the first temperature is less than about 35° C. Preferably, an ampholytic polymeric system is employed that fulfils both requirements, i.e. that it can be regenerated at a temperature of less than about 60° C. and wherein the temperature difference between the second temperature and the first temperature is less than about 35° C.

The ampholytic polymeric systems according to the present invention are very useful in demineralisation, water purification, softening processes of aqueous streams, and chromatographic separation columns. The ampholytic polymeric systems are also very useful in adsorption columns due to their mechanical strength and high toughness. The ampholytic polymeric systems may further be employed over a wide pH range, i.e. a pH of about 2 to about 12.

According to the process according to the present invention, the difference between the second temperature and the first temperature is preferably between 1°-50° C., more preferably 2° C.-20° C., provided that the second temperature is less than 60° C. Alternatively, it is preferred that the first temperature is between 0° and 100° C., more preferably between 2° C. to 50° C., provided that the temperature difference between the second temperature and the first temperature is less than 35° C. Most preferably, the ampholytic polymeric system according to the present invention fulfils both requirements, i.e. that the difference between the second temperature and the first temperature is preferably between 1°-50° C., more preferably 2° C. to 20° C., provided that the second temperature is less than 60° C. and that the first temperature is between 0° and 100° C., more preferably between 2° C. to 50° C., provided that the temperature difference between the second temperature and the first temperature is less than 35° C.

The process for separating the charged species from aqueous systems according to the present invention can preferably be performed in a reversible way. That is, that the process according to the present invention may comprise more than one sequence of steps (a) and (b), e.g. a sequence of three consecutive steps (a) and (b).

EXAMPLES

Example 1

General Procedures

Abbreviations used in the examples are as follows:
NIPAAm: N-isopropyl acryl amide.
P(AAmPSS): poly(2-acrylamido-2-methyl-1-propanesulphonic acid).
AAmPTM.Cl: 3-acrylamidopropyl trimethyl ammonium chloride.
NPAM: N-piperidyl acrylamide.
MBAAm: N,N'-methylenebisacryl amide.
APS: ammonium persulfate.
TMEDA: N,N,N',N'-tetramethyl-ethylenediamine.
AIBN: Azobisisobutyronitrile
DMSO: dimethyl sulfoxide
NMF: N-methylformamide Synthesis of Polymer Systems CS-1 and LX4Q by Bulk Polymerization The polymer systems were prepared by free radical copolymerization using APS/TMEDA as redox initiator. The chemicals (with the exception of APS+TMEDA) were covered with water under argon atmosphere and the reaction mixture was stirred on a magnetic stirrer until all solids were dissolved. APS+TMEDA were then added to initiate the polymerisation, and after 1 minute, the magnetic stirring bar was removed from the homogenous mixture, which was left for hours for slow polymerisation. The polymer system was removed from the flask and put into deionised water during at least one day, a period during which the water was renewed several times. Finally the polymer system was dried in a drying oven for 24 hours at 80° C.

Synthesis of Polymer Systems RD10029-1 and RD10029-6A by Suspension Polymerization All monomers and other components were dissolved into the water including the APS initiator. Next, the water phase was dripped into the paraffin oil phase to obtain a stable water in oil emulsion. Finally, TMEDA was added to accelerate the reaction. The mixture was left for several hours to finish the polymerisation.

In Table 1, the composition of the polymerised mixtures are given.

TABLE 1

| Polymeric system | CS-1 | LX4Q | RD10029-1 | RD10029-6A |
|---|---|---|---|---|
| NIPAAm [mol. eq] | 0.8 | 0.8 | 0.8 | 0.8 |
| P(AAmPSS) * [mol. eq] | 0.15 | 0.15 | 0.15 | 0.15 |
| AAmPTM.Cl [mol. eq] | 0.15 | 0.15 | 0.15 | 0.15 |
| NPAM [mol. eq] | 0.2 | 0.2 | 0.2 | 0.2 |
| MBAAm [mol. eq] | 0.03 | 0.03 | 0.03 | 0.03 |
| APS [mol. eq] | 0.003 | 0.003 | 0.005 | 0.005 |
| TMEDA [mol. eq] | 0.003 | 0.003 | 0.025 | 0.025 |

TABLE 1-continued

| Polymeric system | CS-1 | LX4Q | RD10029-1 | RD10029-6A |
|---|---|---|---|---|
| Total conc. [mol/L] | 2.25 | 0.5 | 2.0 | 2.0 |
| Ratio paraffin oil:water | — | — | 10:1 | 5:1 |

* Amounts based on monomers present in polymer

Example 2

In this example, the preparation of two ampholytic polymeric systems with the same chemical composition (cf. Example 1), but prepared with a different total monomer concentration, is described. Cf Table 2.

The data show that synthesizing a polymeric system at a total higher monomer concentration leads to a more dense system (lower swelling), which has a mechanical strength/toughness high enough to consider it as a solid particle. This 'hard' type system can be used to fill an adsorption column, where the lower strength 'soft' system (as known from WO 2009/028944; the preparations according to Example 1 of WO 2009/028944 were performed with a total monomer concentration of about 0.55 to about 0.95 mol/l) will clog up a column. The swelling ratio is defined as the ratio between the fully swollen and the dry polymeric system.

TABLE 2

| | total monomer concentration [mol/L] | swelling ratio (20° C.) [—] | material |
|---|---|---|---|
| LX4Q | 0.50 | 11.1 | soft |
| CS-1 | 2.25 | 3.3 | hard |

Herein, the efficiency factor EF between two temperatures (e.g. T=20° C. and T=50° C.):

$$EF_{20-50} = \frac{(Ca^{2+}_{red,20} - Ca^{2+}_{red,50})V_o}{100 \, V_{gel,20}}$$

with $Ca^{2+}_{red}$ defined as $$Ca^{2+}_{red} = 100\% * \frac{[Ca^{2+}]_0 - [Ca^{2+}]_m}{[Ca^{2+}]_0}$$

with $Ca^{2+}_{red}$ as the percentage the calcium concentration which has been reduced compared to total concentration, $[Ca^{2+}]_0$ as the total concentration calcium and $[Ca^{2+}]_m$ as the measured concentration calcium. $V_o$ as the total liquid volume, $V_{gel}$ as the gel volume, $V_m$ as the liquid volume outside the gel.

For LX4Q, the EF (i.e. the mean EF for the temperature range 10°-20° C.) was 4.4. For CS-1, the EF was 4.3. As a consequence, performing the preparation at higher total monomer concentration does not affect performance.

Example 3

In this example, the performances of two polymer systems having a similar chemical composition (cf. Example 1) but synthesized using different methods, i.e. bulk polymerization in water and suspension polymerization of monomer/polymer solution droplets in a continuous oil phase, is described. Cf Table 3.

TABLE 3

| | synthesis method | swelling ratio 20° C. [—] | oil:water |
|---|---|---|---|
| CS-1 | bulk | 3.3 | —* |
| RD10029-1 | suspension | 3.8 | 10:1 |
| RD10029-6A | suspension | 3.6 | 5:1 |

*only water

The data of Table 4 (efficiency factor EF) show that the adsorption performance of the polymer systems strongly increases when they are made by suspension polymerization. Additionally, it shows that the performance is sensitive to the choice of the (paraffin) oil:water ratio.

TABLE 4

| gel | EF [—] |
|---|---|
| CS-1 | 4.4 |
| RD10029-1 | 8.0 |
| RD10029-6A | 11.3 |

Example 4

Copper(II) Adsorption Isotherm Determination

In order to construct the copper(II) adsorption isotherms, samples of about 250 mg of dry hydrogel CS-1 (cf. Examples 1 and 2) were put into 25 ml solutions of different concentrations $CuCl_2$ ($1*10^{-4}$ mol/l, $5*10^{-4}$ mol/l, $1.5*10^{-3}$ mol/l and $3.3*10^{-3}$ mol/l) adjusted to ionic strength 0.01 mol/l with NaCl. The solutions are kept at the binding temperature for two days to equilibrate. Next, samples were taken and copper(II) was analysed by colorimetric titration with EDTA. Additionally, the swelling of the gels was measured by weighing the gels on a balance. Isotherms were determined at two temperatures, i.e. 10° and 40° C.

$$Cu_{ads,dry} = \frac{([Cu^{2+}]_0 - [Cu^{2+}]_m)*V_0 - [Cu^{2+}]_m V_{gel}}{m_{gel,dry}}$$

with $Cu_{ads,\,dry}$ as the adsorbed amount of copper(II) per gram dry gel, with $[Cu^{2+}]_0$ as the total concentration calcium and $[Cu^{2+}]_m$ as the measured concentration calcium, $V_0$ as the total volume, $V_{gel}$ as the swollen gel volume and $m_{gel,\,dry}$ as the dry gel mass.

Figure 1:
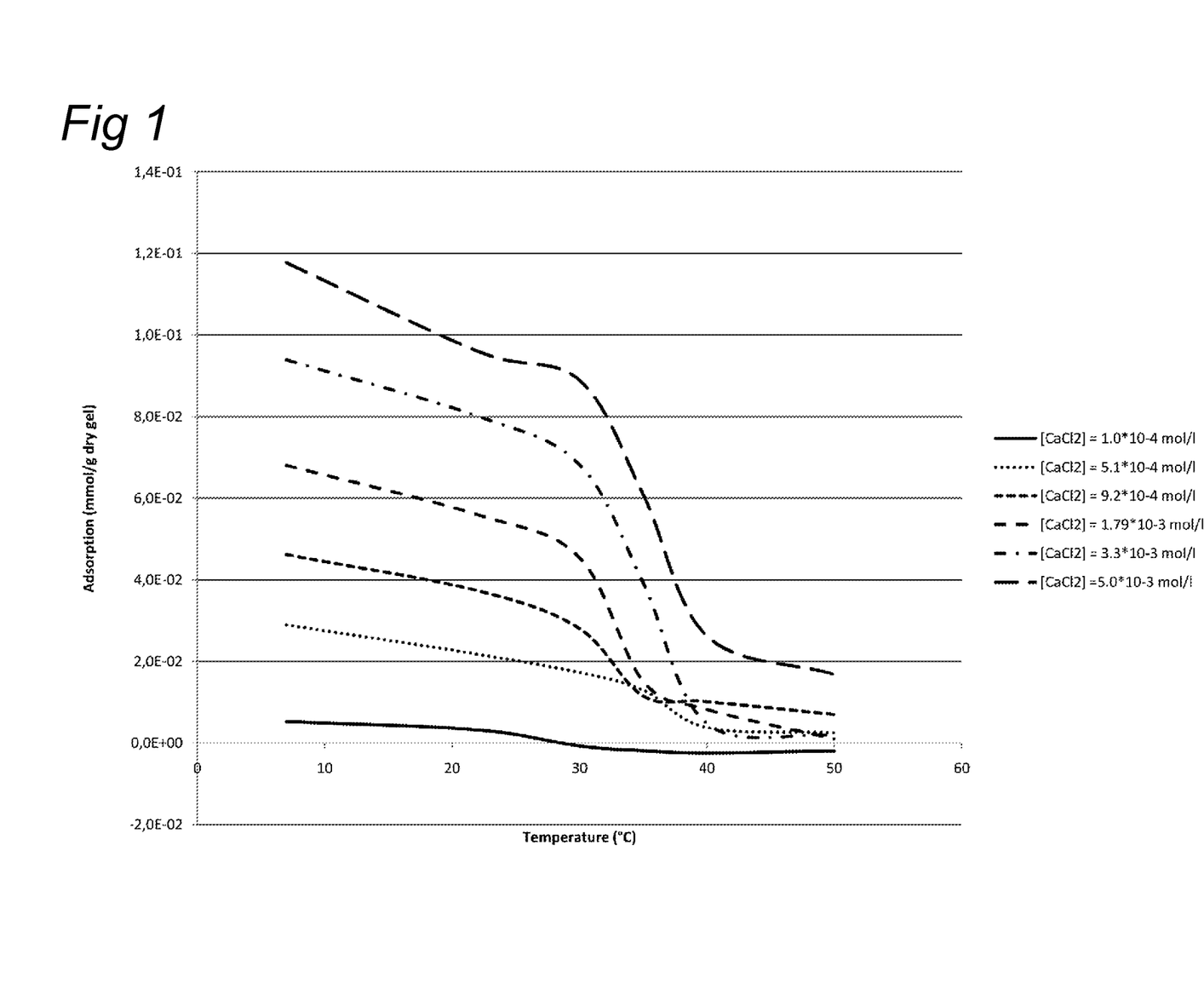
FIG. 1 shows equilibrium adsorption-temperature curves for $Ca^{2+}$ for gel LX4Q at different calcium chloride concentrations at an ionic strength of 0.01 mol/l.
Figure 2:
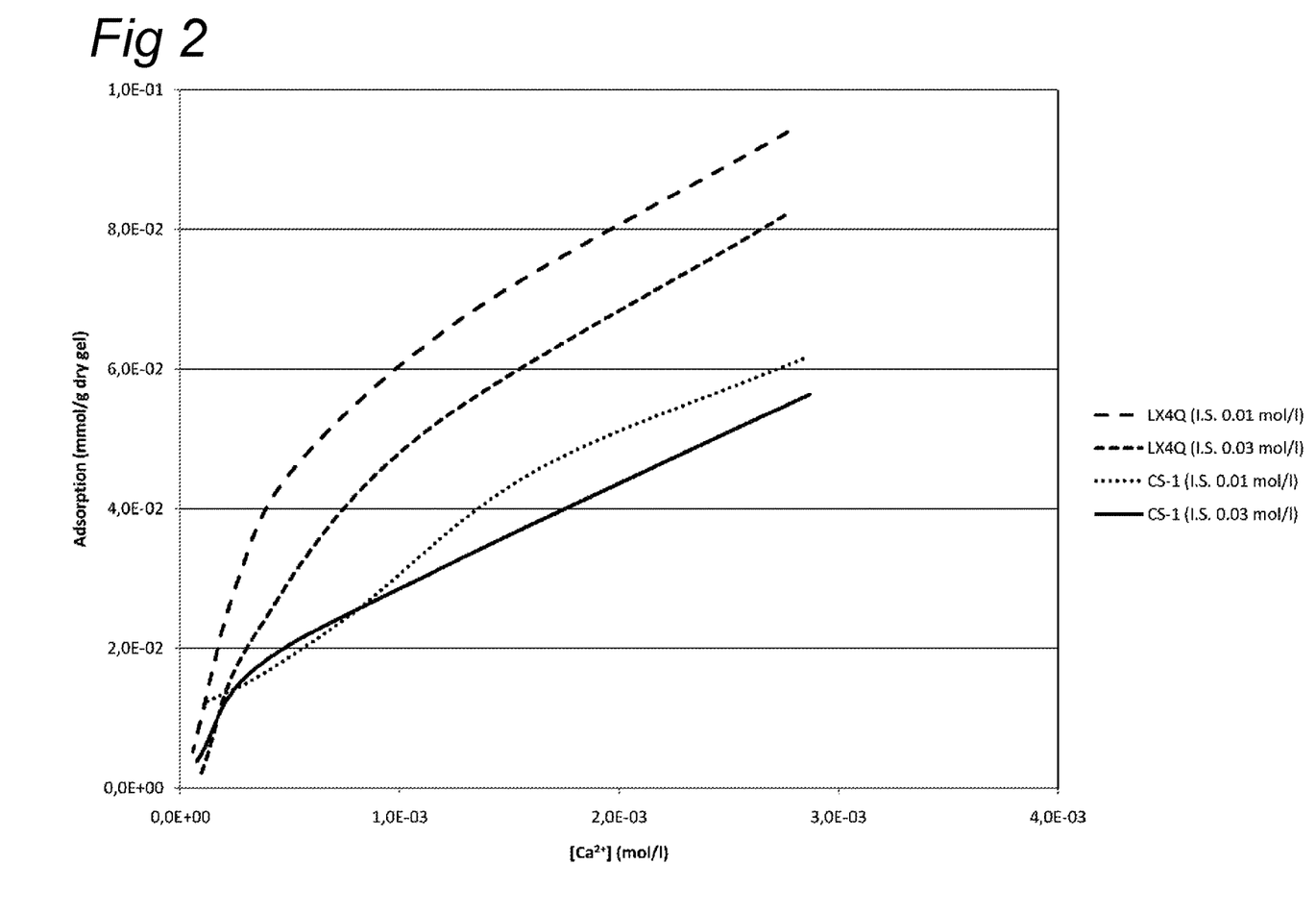
FIG. 2 shows equilibrium adsorption isotherms at 10° C. of $Ca^{2+}$ for gels CS-1 and LX4Q at an ionic strengths of 0.01 mol/l and 0.03 mol/l.
Figure 3:
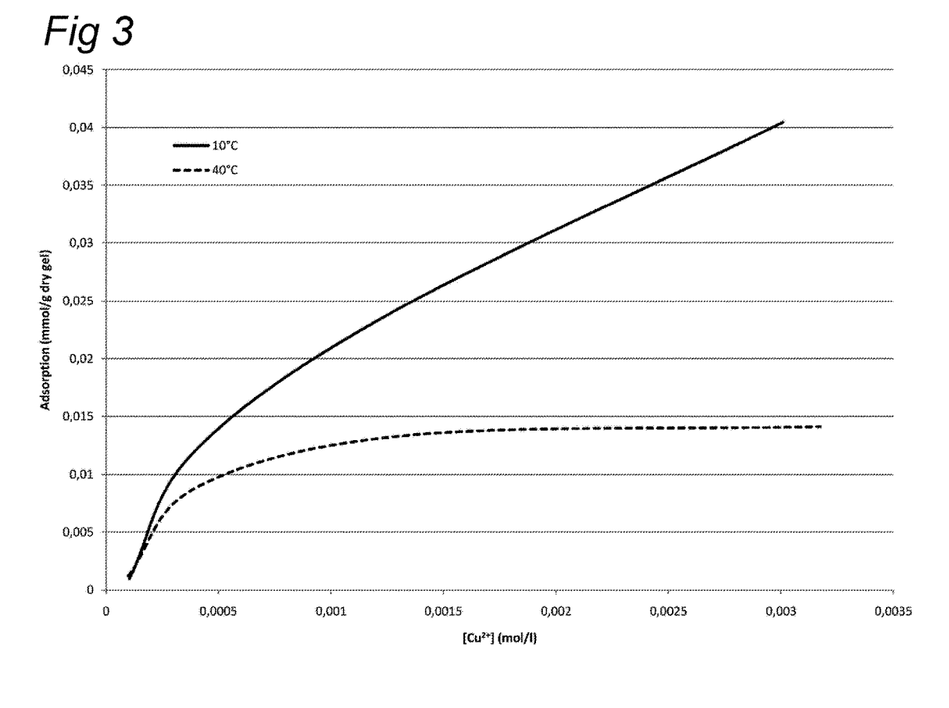
FIG. 3 shows equilibrium adsorption isotherm at 10° C. of $Cu^{2+}$ for gel CS-1 at an ionic strength of 0.01 mol/l.

The adsorption isotherms at two temperatures are shown in FIG. 3. It clearly shows that there is lower adsorption at the higher temperature of 40° C., which shows that hydrogel CS-1 has a lower affinity for copper(II) ions at a temperature above the LCST of the hydrogel.

Example 5

In Table 2, the composition of the polymerised mixtures are given.

TABLE 2

| Polymeric system | DM-3 | NMF-2 | DM-6 |
|---|---|---|---|
| NIPAAm [mol. eq] | 0.8 | 0.8 | 0.9 |
| P(AAmPSS) * [mol. eq] | 0.05 | 0.05 | 0.05⁺ |
| AAmPTM.Cl [mol. eq] | 0.05 | 0.05 | 0.05 |
| NPAM [mol. eq] | 0.2 | 0.2 | 0.1 |
| MBAAm [mol. eq] | 0.03 | 0.03 | 0.03 |
| APS [mol. eq] | — | 0.003 | — |
| TMEDA [mol. eq] | — | 0.003 | — |
| AIBN [mol. eq] | 0.003 | — | 0.003 |
| Total conc. [mol/L] | 1.8 | 3.0 | 4.1 |
| NMF # | — | 100 wt % | — |
| DMSO # | 80 wt % | — | 100 wt % |
| Water # | 20 wt % | — | — |

* Amounts based on monomers present in polymer
weight percentages based on total solvent amount
⁺polymer used in acid form Synthesis of Polymer System DM-3 in DMSO/Water by Bulk Polymerization The polymer system was prepared by free radical copolymerization using AIBN as redox initiator. The chemicals (with the exception of AIBN) were covered with water/DMSO under argon atmosphere and the reaction mixture was stirred on a magnetic stirrer until all solids were dissolved. AIBN was then added to initiate the polymerisation, and after 1 minute, the magnetic stirring bar was removed from the homogenous mixture, which was left for hours for slow polymerisation at 60° C. The polymer system was removed from the flask and put into deionised water during at least one day, a period during which the water was renewed several times. Finally the polymer system was dried in a drying oven for 24 hours at 80° C.

Example 6

Synthesis of Polymer System NMF-2 in NMF by Bulk Polymerization

The polymer system was prepared by free radical copolymerization using APS+TMEDA as redox initiator. The chemicals (with the exception of APS+TMEDA) were covered with NMF under argon atmosphere and the reaction mixture was stirred on a magnetic stirrer until all solids were dissolved. APS+TMEDA was then added to initiate the polymerisation, and after 1 minute, the magnetic stirring bar was removed from the homogenous mixture, which was left for hours for slow polymerisation. The polymer system was removed from the flask and put into deionised water during at least one day, a period during which the water was renewed several times. Finally the polymer system was dried in a drying oven for 24 hours at 80° C.

Example 7

Synthesis of Polymer System DM-6 in DMSO by Bulk Polymerization

The polymer system was prepared by free radical copolymerization using AIBN as redox initiator. The chemicals (with the exception of AIBN) were covered with DMSO under argon atmosphere and the reaction mixture was stirred on a magnetic stirrer until all solids were dissolved. AIBN was then added to initiate the polymerisation, and after 1 minute, the magnetic stirring bar was removed from the homogenous mixture, which was left for hours for slow polymerisation at 60° C. The polymer system was removed from the flask and put into deionised water during at least one day, a period during which the water was renewed several times. Finally the polymer system was dried in a drying oven for 24 hours at 80° C.

The invention claimed is:

1. An ampholytic polymeric system obtainable by copolymerizing (i) a monomer according to Formula (1) and (ii) an ethylenically unsaturated cationic monomer in the presence of (iii) a (co)polymer comprising an ethylenically unsaturated anionic monomer comprising a sulfonate group:

(1)

wherein X is O or $NR^2$, $R^1$ and $R^2$ are independently selected from the group consisting of hydrogen and $C_1$-$C_6$ alkyl groups or wherein $R^1$ and $R^2$ form together a $(CR^1R^2)_n$-chain, wherein n is 3 to 12, and wherein $R^3$ is independently selected from the group consisting of hydrogen and $CH_3$, and wherein the copolymerization is conducted with a total monomer concentration of about 1.5 mol/l to about 5.0 mol/l, calculated on the amount of monomers (i), (ii) and (iii).

2. The ampholytic polymeric system according to claim 1, wherein X is $NR^2$.

3. The ampholytic polymeric system according to claim 2, wherein $R^2$ is hydrogen and $R^1$ is i-$C_3H_7$.

4. The ampholytic polymeric system according to claim 1, wherein the ethylenically unsaturated cationic monomer has Formula (2):

(2)

or Formula (3):

(3)

or Formula (4):

(4)

wherein:
Y is O or $NR^5$;
$R^3$ is independently selected from the group consisting of hydrogen and $CH_3$;
$R^4$ is independently selected from the group consisting of hydrogen, $C_1$-$C_{12}$ alkyl, $C_6$-$C_{12}$ aryl and $C_7$-$C_{12}$ and arylalkyl;
$R^5$ is independently selected from the group consisting of hydrogen and $C_1$-$C_6$ alkyl;
A is a $C_1$-$C_{12}$ alkylene chain; and
the ethylenically unsaturated cationic monomer comprises a counter-ion $X^-$.

5. The ampholytic polymeric system according to claim 1, wherein the ethylenically unsaturated anionic monomer has Formula (5):

(5)

or Formula (6):

(6)

wherein:
$R^3$ is independently selected from the group consisting of hydrogen and $CH_3$;
$R^5$ is independently selected from the group consisting of hydrogen and $C_1$-$C_6$ alkyl;
A is a $C_1$-$C_{12}$ alkylene chain; and
M is a metal of Group 1 of the Periodic Table of the Elements.

6. The ampholytic polymeric system according to claim 1, wherein the copolymerization is performed in the presence of a cross-linker.

7. The ampholytic polymeric system according to claim 6, wherein the cross-linker has the Formula (7):

(7)

wherein:
$R^3$ is independently selected from the group consisting of hydrogen and $CH_3$;
Y is independently selected from the group consisting of O and $NR^5$;
$R^5$ is independently selected from the group consisting of hydrogen and $C_1$-$C_6$ alkyl; and
B is independently selected from the group consisting of —$(CR^5_2)_m$—, wherein m is 1-12, and $(CH_2$—$CHR^3$—$O)_m$—, wherein m is 1-50.

8. The ampholytic polymeric system according to claim 1, wherein the copolymerization is performed in a water-in-oil emulsion.

9. The ampholytic polymeric system according to claim 1, wherein the copolymerization is conducted with a total monomer concentration of 1.5 mol/l to 4.0 mol/l, calculated on the amount of monomers (i), (ii) and (iii).

10. A process for the preparation of an ampholytic polymeric system, comprising copolymerizing (i) a monomer according to Formula (1) and (ii) an ethylenically unsaturated cationic monomer in the presence of (iii) a (co) polymer comprising an ethylenically unsaturated anionic monomer comprising a sulfonate group:

(1)

wherein X is O or $NR^2$, $R^1$ and $R^2$ are independently selected from the group consisting of hydrogen and $C_1$-$C_6$ alkyl groups or wherein $R^1$ and $R^2$ form together a $(CR^1R^2)_n$-chain, wherein n is 3 to 12, and wherein $R^3$ is independently selected from the group consisting of hydrogen and $CH_3$, and wherein the copolymerization is conducted with a total monomer concentration of about 1.5 mol/l to about 5.0 mol/l, calculated on the amount of monomers (i), (ii) and (iii).

11. The process according to claim 10, wherein the process is conducted in a solvent-in-oil emulsion.

12. The process according to claim 11, wherein the oil:solvent ratio is between about 2:1 to about 20:1.

13. The process according to claim 10, wherein the copolymerization is conducted with a total monomer concentration of 1.5 mol/l to 4.0 mol/l, calculated on the amount of monomers (i), (ii) and (iii).

14. A process for separating a charged species from a first aqueous system, comprising:
   (a) contacting the first aqueous system comprising the charged species at a first temperature with an ampholytic polymeric system according to claim 1, resulting in bonding of the charged species to the ampholytic polymeric system; and
   (b) contacting the ampholytic polymeric system of step (a) to which the charged species is bound with a second aqueous system at a second temperature, wherein the charged species is released to the second aqueous system, wherein the second temperature is higher than the first temperature.

15. The process according to claim 14, wherein the difference between the second temperature and the first temperature is between about 1° C. to about 50° C.

* * * * *